US009268733B1

(12) United States Patent
Rachabathuni

(10) Patent No.: US 9,268,733 B1
(45) Date of Patent: Feb. 23, 2016

(54) DYNAMICALLY SELECTING EXAMPLE PASSAGES

(75) Inventor: Sailesh Rachabathuni, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 269 days.

(21) Appl. No.: 13/042,185

(22) Filed: Mar. 7, 2011

(51) Int. Cl.
*G06F 3/048* (2013.01)
*G06F 15/02* (2006.01)
*G06F 3/0483* (2013.01)

(52) U.S. Cl.
CPC .......... *G06F 15/0291* (2013.01); *G06F 3/0483* (2013.01)

(58) Field of Classification Search
CPC .. G06F 3/0483; G06F 15/0291; G06F 17/217
See application file for complete search history.

(56) References Cited

U.S. PATENT DOCUMENTS

| | | | |
|---|---|---|---|
| 5,416,896 A | 5/1995 | Motoyama | |
| 5,483,629 A | 1/1996 | Motoyama et al. | |
| 5,745,776 A | 4/1998 | Sheppard, II | |
| 6,120,297 A | 9/2000 | Morse, III et al. | |
| 6,154,757 A | 11/2000 | Krause et al. | |
| 6,331,867 B1 | 12/2001 | Eberhard et al. | |
| 6,419,496 B1 | 7/2002 | Vaughan, Jr. | |
| 6,438,579 B1 | 8/2002 | Hosken | |
| 6,728,752 B1 | 4/2004 | Chen et al. | |
| 6,961,722 B1 | 11/2005 | Bruecken | |
| 7,814,112 B2 | 10/2010 | Gupta et al. | |
| 7,849,393 B1 * | 12/2010 | Hendricks et al. ............ | 715/203 |
| 7,966,334 B1 | 6/2011 | Bezos et al. | |
| 8,099,660 B1 | 1/2012 | O'Sullivan et al. | |
| 8,118,224 B2 | 2/2012 | Barsness et al. | |
| 8,250,071 B1 * | 8/2012 | Killalea et al. ................ | 707/728 |
| 8,286,885 B1 | 10/2012 | Zehr et al. | |
| 2002/0082939 A1 | 6/2002 | Clark et al. | |
| 2002/0120651 A1 | 8/2002 | Pustejovsky et al. | |
| 2003/0028564 A1 | 2/2003 | Sanfilippo | |
| 2003/0160830 A1 | 8/2003 | DeGross | |
| 2004/0064369 A1 | 4/2004 | Kato | |
| 2004/0201633 A1 | 10/2004 | Barsness et al. | |
| 2004/0248653 A1 | 12/2004 | Barros et al. | |
| 2005/0060266 A1 | 3/2005 | DeMello et al. | |
| 2005/0069849 A1 | 3/2005 | McKinney et al. | |
| 2005/0193330 A1 | 9/2005 | Peters | |
| 2006/0041538 A1 * | 2/2006 | King et al. ........................ | 707/3 |

(Continued)

OTHER PUBLICATIONS

Haupt, "Fun and Functional. Interesting new consumer-technology products", Horizon Air Magazine, Mar. 2010, 8 pages.

(Continued)

*Primary Examiner* — Tadeese Hailu

(74) *Attorney, Agent, or Firm* — Lee & Hayes, PLLC

(57) ABSTRACT

Techniques for dynamically selecting example passages to output on an electronic device in response to a user selecting a word or other portion of a content item are described herein. In one example, a user selects a word from a rendered electronic book. In response, the device outputs an entry for the word from a reference work (e.g., a definition from a dictionary, etc.). In addition, the device outputs passages that include the word from other electronic books stored on the device. These passages are more likely to be recognized and appreciated by the user than generic passages, since the dynamically-selected passages are found in electronic books that the user has previously acquired and potentially previously read.

39 Claims, 8 Drawing Sheets

(56) References Cited

U.S. PATENT DOCUMENTS

| | | | |
|---|---|---|---|
| 2006/0101012 A1 | 5/2006 | Carson et al. | |
| 2006/0230340 A1* | 10/2006 | Parsons et al. | 715/514 |
| 2006/0277046 A1 | 12/2006 | Lachish et al. | |
| 2006/0282778 A1* | 12/2006 | Barsness et al. | 715/726 |
| 2007/0011160 A1 | 1/2007 | Ferland et al. | |
| 2007/0136231 A1 | 6/2007 | Padmanabhan | |
| 2007/0265834 A1 | 11/2007 | Melnick | |
| 2007/0269775 A1 | 11/2007 | Andreev et al. | |
| 2008/0082930 A1 | 4/2008 | Omernick et al. | |
| 2008/0141182 A1 | 6/2008 | Barsness et al. | |
| 2008/0222552 A1* | 9/2008 | Batarseh et al. | 715/776 |
| 2009/0144051 A1 | 6/2009 | Lee et al. | |
| 2009/0246744 A1 | 10/2009 | Lofthus et al. | |
| 2010/0003659 A1 | 1/2010 | Edmonds | |
| 2010/0005087 A1 | 1/2010 | Basco et al. | |
| 2010/0020030 A1 | 1/2010 | Kim et al. | |
| 2010/0021871 A1 | 1/2010 | Layng et al. | |
| 2010/0128994 A1 | 5/2010 | Zwolinski | |
| 2010/0153440 A1 | 6/2010 | Hubert | |
| 2010/0245282 A1 | 9/2010 | Lai | |
| 2010/0273138 A1 | 10/2010 | Edmonds et al. | |
| 2010/0311030 A1 | 12/2010 | He et al. | |
| 2011/0018695 A1 | 1/2011 | Bells et al. | |
| 2011/0076654 A1 | 3/2011 | Green et al. | |
| 2011/0087955 A1 | 4/2011 | Ho et al. | |
| 2011/0123967 A1 | 5/2011 | Perronnin et al. | |
| 2011/0161073 A1 | 6/2011 | Lesher et al. | |
| 2011/0167350 A1* | 7/2011 | Hoellwarth | 715/727 |
| 2011/0261030 A1* | 10/2011 | Bullock | 345/204 |
| 2012/0005617 A1 | 1/2012 | Lee et al. | |
| 2012/0211438 A1* | 8/2012 | Glover | 210/749 |
| 2012/0221972 A1* | 8/2012 | Patterson et al. | 715/810 |
| 2012/0240081 A1 | 9/2012 | Sim et al. | |
| 2012/0240085 A1* | 9/2012 | Sim et al. | 715/864 |

OTHER PUBLICATIONS

"Babylon 8 Translation Softwar and Dictionary Tool" retrieved on May 7, 2010 at <<http://www.babylon.com/>>, entire website, Babylon, 2 pages.

Office action for U.S. Appl. No. 12/749,073, mailed on Jan. 20, 2012, Rachabathuni et al., "Context-Sensitive Reference Works", 25 pages.

Office action for U.S. Appl. No. 12/823,077, mailed on Oct. 9, 2012, Freed, "Surfacing Reference Work Entries on Touch-Sensitive Displays", 12 pages.

Office action for U.S. Appl. No. 12/749,073, mailed on Jul. 5, 2012, Rachabathuni et al., "Context-Sensitive Reference Works", 22 pages.

Office action for U.S. Appl. No. 12/823,085, mailed on Feb. 1, 2013, Keller et al., "Refining Search Results Based on Touch Gestures", 17 pages.

Office action for U.S. Appl. No. 12/749,073, mailed on Apr. 9, 2013, Rachabathuni et al., "Context-Sensitive Reference Works", 21 pages.

Office action for U.S. Appl. No. 12/823,086, mailed on Jun. 26, 2013, Keller, "Surfacing Instances of a Selected Content Portion", 15 pages.

Final Office Action for U.S. Appl. No. 12/749,073, mailed on Oct. 9, 2013, Sailesh Rachabathuni, "Context-Sensitive Reference Works", 22 pages.

Office Action for U.S. Appl. No. 13/927,456, mailed on Nov. 20, 2013, Ian W. Freed, "Providing Reference Work Entries on Touch-Sensitive Displays", 12 pages.

Final Office Action for U.S. Appl. No. 12/730,187, mailed on Nov. 22, 2013, Oleksandr Y. Berezhnyy, "Vocabulary Builder", 16 pages.

Office action for U.S. Appl. No. 12/729,913, mailed on Nov. 23, 2012, Berezhnyy et al., "Vocabulary Building of Words Identified During eBook Consumption", 19 pages.

Office action for U.S. Appl. No. 12/730,187, mailed on Mar. 26, 2013, Berezhnyy et al., "Vocabulary Builder", 17 pages.

Final Office Action for U.S. Appl. No. 12/823,086, mailed on Mar. 7, 2014, Kevin E. Keller, "Surfacing Instances of a Selected Content Portion", 12 pages.

Office Action for U.S. Appl. No. 13/553,172, mailed on Apr. 10, 2014, Tom Killalea, "Disambiguation of Term Meaning", 15 pages.

Office action for U.S. Appl. No. 12/729,913, mailed on Apr. 28, 2014, Berezhnyy et al., "Vocabulary Building of Words Identified During eBook Consumption", 22 pages.

Office Action for U.S. Appl. No. 12/823,086, mailed on Jun. 2, 2014, Kevin E. Keller, "Surfacing Instances of a Selected Content Portion", 15 pages.

Non-Final Office Action for U.S. Appl. No. 12/729,913, mailed on Jul. 30, 2012, Oleksandr Y. Berezhnyy et al., "Vocabulary Building of Words Identified During eBook Consumption", 18 pages.

Websters, "Third New International Dictonary of the English Language", G.C. Merriam Company, Springfield Massachusetts, 1965, 2 pages.

Office Action for U.S. Appl. No. 12/729,913, mailed on Aug. 15, 2014, Oleksandr Y. Berezhnyy, "Vocabulary Building of Words Identified During eBook Consumption", 31 pages.

Office Action for U.S. Appl. No. 12/823,086, mailed on Oct. 24, 2014, Kevin E Keller, "Surfacing Instances of a Selected Content Portion", 16 pages.

Office Action for U.S. Appl. No. 12/823,086, mailed on Jan. 22, 2015, Kevin E Keller, "Surfacing Instances of a Selected Content Portion", 17pages.

Final Office Action for U.S. Appl. No. 12/729,913, mailed on Nov. 28, 2014, Oleksandr Y. Berezhnyy, Vocabulary Building of Words Identified During eBook Consumption, 25 pages.

Final Office Action for U.S. Appl. 12/823,086, mailed on Jul. 8, 2015, Kevin E. Keller, "Surfacing Instances of a Selected Content Portion", 16 pages.

\* cited by examiner

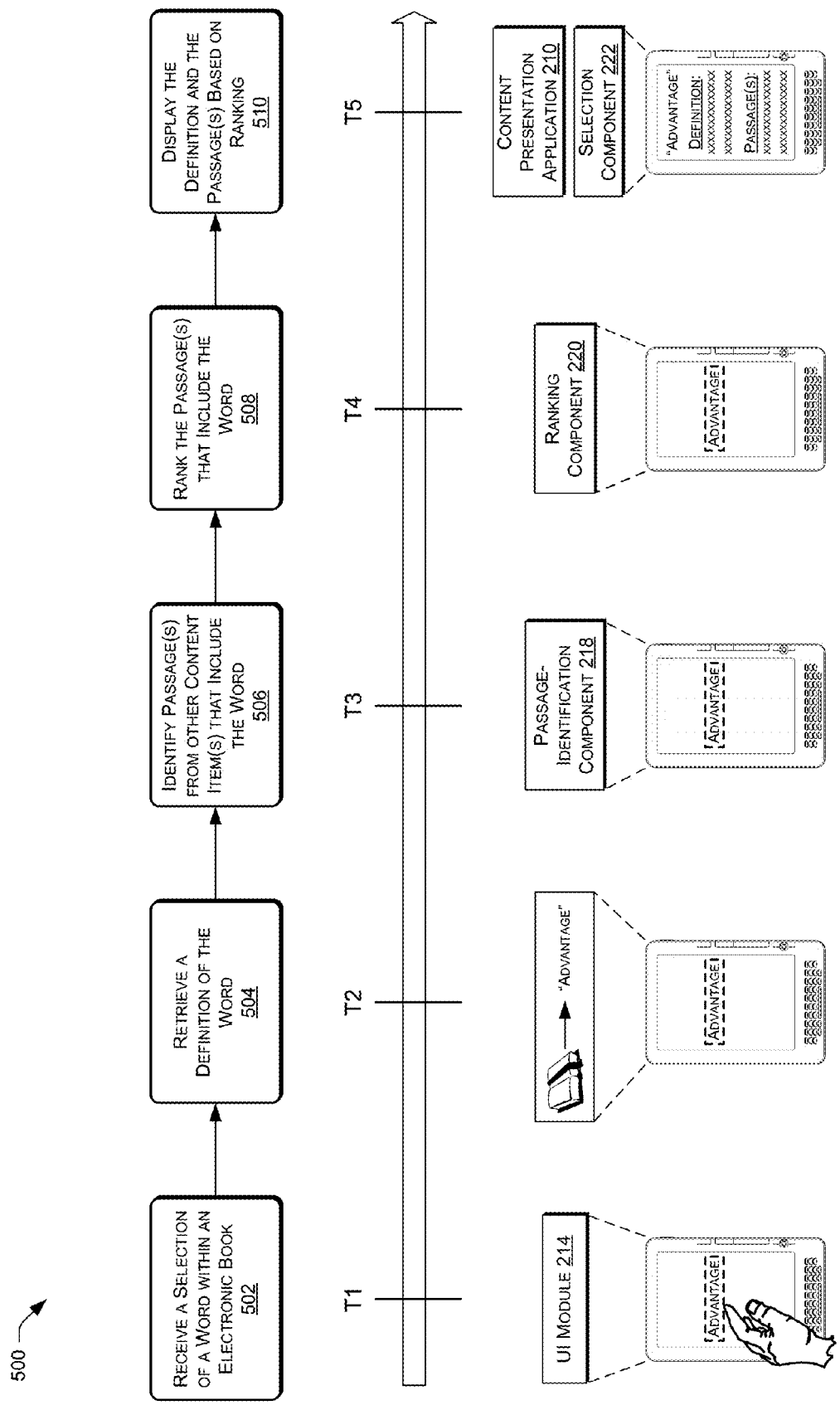

DYNAMICALLY SELECTING EXAMPLE PASSAGES

BACKGROUND

A large and growing population of users is consuming digital content items on a varying array of electronic devices. These electronic devices include dedicated electronic book reader devices, smartphones, desktop computers, laptop computers, personal digital assistants (PDAs), tablet computing devices, and the like. While consuming content on these devices, users often utilize one or more reference works stored on or accessible by the devices. For instance, when reading an electronic book on an electronic book reader, a user may request to view a definition of a word that the user does not know the meaning of. In response, the device may display a definition of the word from a dictionary. However, because dictionaries or other reference works often include static content, the displayed definition or other type of reference work entry is often static. As such, the displayed definition or other entry is common across different users and devices.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 5 is a flow diagram of an illustrative process that includes receiving a selection of a word, retrieving a definition of the word, identifying and ranking passages that include the word from other content items, and displaying the definition and one or more other passages based on the ranking.

DETAILED DESCRIPTION

Figure 1:
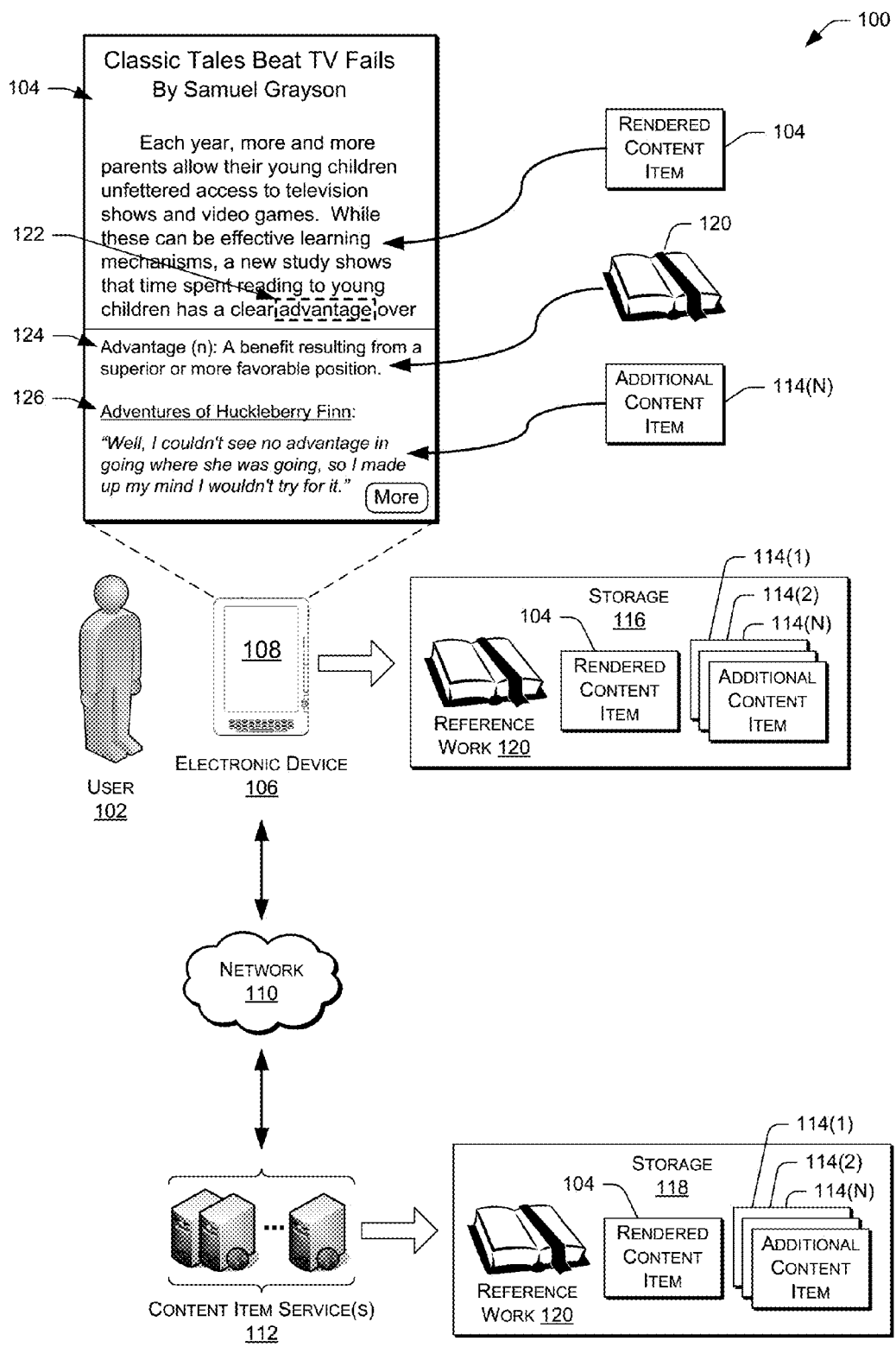
FIG. 1 illustrates an example architecture in which a user reads a content item on an electronic device and requests to view a definition a word found within the content item. In response, the device displays a definition of the word, as well as an example passage that includes the word and is located within another content item accessible to the electronic device.

This disclosure describes systems, devices, and processes (collectively "techniques") for dynamically selecting example passages to output on an electronic device in response to a user selecting a word or other portion of a content item.

For instance, when a user consumes (e.g., reads, listens to, etc.) a content item on an electronic device, the user may select a portion of the content item for the purpose of learning additional information about the selected portion. In one example, the user may select a portion of text found within the content item. In response, the techniques may retrieve a reference work entry associated with the selected portion. The reference work may comprise a dictionary, an encyclopedia, a thesaurus, an atlas, an almanac, a gazetteer, or any other type of reference work.

In addition, the techniques may identify one or more passages that include some or the entire selected portion from other content items that are associated with the user or the device. For instance, the passages may be identified from content items that are accessible to the electronic device (e.g., items stored locally on the device or stored remotely in an account associated with the user or the device).

In one example, when a user selects a particular word from an electronic book (e.g., "advantage"), the techniques may attempt to find one or more other passages from other content items that either include the same word or include a stem of this word (e.g., "advantaged", "advantages", etc.). In some instances, the techniques attempt to find these passages from content items that the electronic device has access to due to the user previously purchasing or otherwise obtaining the items. As such, these accessible content items may reside locally or may be stored remotely on an account associated with the user and/or the device.

After identifying other passages from other content items that include the word or the stem of the word, the techniques may rank these passages and output one or more of these passages based at least in part on the ranking. These passages may be output at a same time as the retrieved reference work entry, or at another time (e.g., one after the other, etc.). By outputting both the reference work entry and the example passage(s), the techniques aid the user in better understanding the meaning or context of the selected word. Furthermore, by surfacing a dynamically-selected passage from a content item that the user has previously obtained, the user is more likely to understand the meaning or context of the word based on the passage. That is, because the techniques surface one or more passages from content items that the user has previously purchased or otherwise obtained, it is more likely that the user will recognize and appreciate these example passages as compared to generic passages found in a static dictionary or other type of reference work.

In order to dynamically select passages in this manner, the techniques may rank the identified passages in any number of ways. In one example, the techniques may assign weights to the identified passages and may output passages based at least in part on the assigned weights. For instance, the techniques may output a highest ranking passage (or a number of highest ranking passages) based on the weights, may output each passage having a cumulative weight that is greater than a threshold amount, or the like. Furthermore, it is to be appreciated that while the examples described below describe identifying passages from content items and then assigning weights to the passages, in other instances the techniques may assign weights to content items and then identify passages therein.

In one example, the techniques assign a weight to each passage based on whether the passage exactly matches the selected word (e.g., "advantage" and "advantage"), or whether the passage includes a word that only matches a stem of the selected word (e.g., "advantaged" and "advantage"). The techniques may, in some instances, assign a higher weight to passages that include exact-matching words.

In another example, the techniques may rank the identified passages by first identifying a genre or category of the rendered content item—that is, of the content item that includes the selected word. The techniques may then compare this genre to each content item that includes a passage that includes the selected word. The techniques may then rank the passages based on this comparison. In one example, the techniques assign a higher weight to passages from content items that are from a same or similar genre or category as the rendered content item. For example, if a user selects a word from within a "medical-related" content item, then passages from other medical-related content items may be assigned a higher weight than passages from non-medical-related items.

A genre or category of a content item may be determined in a multitude of different ways, such as by analyzing a categorization of the content item in an electronic catalog, by identifying keywords within the content item, by utilizing crowd-sourcing techniques, or the like. In some instances, genres or categories may be determined using techniques described in U.S. patent application Ser. No. 12/749,073, filed on Mar. 29, 2010 and entitled "Context-Sensitive Reference Works", which is in herein incorporated by reference in its entirety.

In another example, the techniques may rank the passages based on how recently the user accessed the corresponding content item. For instance, if the techniques identify ten passages that include the selected word from ten different content items, the techniques may determine when the user last read or otherwise accessed each of the ten content items. The techniques may then rank the passages based at least in part on these determined times. In one example, passages associated with content items that have been read or otherwise accessed more recently may be assigned a weight that is greater than passages associated with content items that have not been read or accessed in quite some time. By doing so, the techniques are more likely to output passages that are fresh in the mind of the user and, hence, passages that are more likely to help the user understand the meaning or context of the selected word.

In yet another example, the techniques may rank the passages based on ratings associated with the content items. For instance, for each content item having a passage that includes the selected word, the techniques may determine a rating associated with the underlying content item. This may be the rating assigned to the content item by a user of the device, or by a community of users (e.g., all users that have provided a rating of the content item to a rating service). Then, the techniques may assign higher weights to passages that are from higher-rated content items. Similarly, the techniques may determine how often a particular content item appears in user-created lists (e.g., on a merchant web site), and may assign a higher weight to content items that appear on a relatively greater number of lists.

In yet another example, the techniques may assign weights to the passages based on how often the passages have been annotated. These annotations include users having commented on a passage, highlighted a passage, saved a passage, or otherwise having indicated an interest in a particular passage. After identifying a number of times that a passage has been annotated or a number of unique users that have annotated the passages, the techniques may assign weights to the passages accordingly. In some instances, passages that have been annotated more times and/or by more users receive higher weights than other passages.

In still other instances, the techniques identify which passages the user of the electronic device has annotated, and assigns even higher weights to these passages. By weighting more greatly passages that the user has previously shown an interest in, the techniques again output passages that are likely to help the user understand the selected word associated with these passages.

While a few example factors have been listed, the techniques may take into account any other factor or combination of factors when determining which passages to output on the electronic device, and a manner (e.g., order, style, etc.) in which to output these passages. For instance, the techniques may take into account information associated with the user (e.g., age, preferences, etc.), a geographical location of the device (e.g., determined via triangulation or global positioning satellites (GPS)), and/or the like.

Further, and as described below, the content items and the passages may comprise any sort of content that is able to be output visually, audibly, tactilely, or in any other user-perceivable manner. For instance, the passages may include sentences from books, clippings from websites, posts from a social networking, blogging, or micro-blogging services, audio clips, video clips, images, or the like.

The claimed techniques are described below with reference to an example architecture. However, it is to be appreciated that a number of other architectures may also employ these techniques.

Example Architecture

FIG. 1 illustrates an example architecture 100 in which a user 102 reads a content item 104 displayed on an electronic device 106. As described in detail below, in this example the user 102 requests to view a definition a word found within the content item 104 and, in response, the device 106 displays a definition of the word as well as an example passage that includes the word. Here, the example passage is located within another content item accessible to the electronic device 106.

In this example, the electronic device 106 has a display 108 upon which electronic content such as content items or electronic books may be rendered. The terms content, content item, and electronic book include essentially any form of electronic data that may be consumed on a device, including textual and verbal works comprising sequences of words such as digital books, audio books, electronic magazines, papers, journals, periodicals, documents, instructional materials, course content, website content, music, movies, and so on. In other examples, the user 102 may employ electronic devices that do not include a display, but rather include speakers or another output device for outputting audio or the like.

As such, the electronic device 106 may comprise a desktop computer, a laptop computer, or any other type of electronic device. In some instances, the electronic device 106 may be a handheld or other small, light-weight, portable device upon which electronic books and other content can be rendered and conveniently viewed in a manner similar to viewing a paper book. Examples of electronic book readers include flat form-factor devices such as tablets, pads, smartphones, personal digital assistants (PDAs), and the like, as well as other types of electronic devices configured to render electronic books (e.g., personal computers, laptop computers, etc.).

In some embodiments, the electronic device 106 may comprise a dedicated-purpose electronic book reader device, having a flat-panel display and other characteristics that mimic the look, feel, and experience offered by paper-based books. For example, such an electronic book reader devices may have a high-contrast flat-panel display that appears similar to a printed page and that persist without frequent refreshing. Such displays may consume very negligible amounts of power, so that the electronic book reader devices may be used for long periods without recharging or replacing batteries. In some instances, these readers may employ electrophoretic displays.

In the example of FIG. 1, the electronic device 106 has networking capabilities. For example, the electronic device 106 may have a wireless communication interface that allows communication though a network 110. The wireless communications interfaces may utilize WiFi, cellular, or other wireless data and networking technologies. The network 110 may be any type of communication network, including a local-area network, a wide-area network, the Internet, a wireless network, a wide-area network (WWAN), a cable television network, a telephone network, a cellular communications network, combinations of the foregoing, etc.

In the described embodiment, the electronic device 106 includes non-volatile storage capabilities so that electronic content items can be downloaded and stored in their entirety on the device. In some instances, once an electronic book has been stored by an electronic reader, it can be displayed and read at any time, whether or not the electronic reader is connected to a network. In other embodiments, meanwhile, the device may stream or otherwise receive content items on-demand.

In the configuration illustrated by FIG. 1, the electronic device 106 may obtain content items from a content item service 112 and/or from any other service. The service 112 and other services may be accessed using the networking capabilities of the electronic device 106. The service 112 and the other services may be accessible through other means as well, such as by connection to intermediary devices like personal computers, different types of mobile devices, and so forth.

In FIG. 1, the content item service 112 is illustrated as a network-based or cloud-based service, available over a public network such as the Internet. The electronic device 106 may be configured to allow the user 102 to conveniently browse for content and content items from the service 112, and to purchase and download selected content items from the service 112.

Various applications and user interfaces may be used in conjunction with the electronic device 106 to interact with the service 112, such as Internet browser programs that allow a user to interactively engage different online services. In addition, the service 112 may expose lower-level interfaces or APIs (application programming interfaces) through the network 110, through which devices and programs can access the underlying functionality of the service 112 without direct user interaction.

The service 112 might be implemented in some embodiments by an online merchant or vendor. Electronic books and other electronic content might be offered for sale by such an online merchant, or might be available to members or subscribers for some type of periodic or one-time fee. In some circumstances, electronic books or other content might be made available without charge. In either instance, the service 112 may include a client interface through which the electronic device 106 and other devices interact with the service 112. The client interface may include a virtual storefront or other type of online interface for interaction with consumers and/or devices. The client interface may expose a graphical, web-based user interface that can be accessed by human users to browse and obtain (e.g., purchase, rent, lease, etc.) content items such as electronic books. The client interface may also expose programmatic interfaces or APIs that entities and devices can use to obtain digital content items and related services.

In the illustrated example, the user 102 may have utilized the web-based user interface or the APIs to obtain the content item 104 being rendered by the display 108. In addition, the user 102 may have also obtained one or more additional content items 114(1), 114(2), . . . , 114 (N) from the service 112 or another service, as illustrated in FIG. 1. In some instances, the electronic device 106 may include non-volatile storage 116 that stores the currently-rendered content item 104 and the additional content items 114(1)-(N), while in other instances these items may be stored remotely from the electronic device. For instance, the content item service 112 may store, in non-volatile storage 118, these items in association with an account of the electronic device 106 and/or the user 102. Furthermore, in some instances, the electronic device 106 may locally store a portion of the content items previously acquired by the user, while the service 112 (or another remote entity) may store, in an account of the user 102 or the device 106, other content items that the user 102 has previously acquired.

Furthermore, FIG. 1 illustrates that the electronic device or the content item service 112 may store one or more reference works 120 that are accessible to the electronic device 106. The reference work(s) 120 may include a dictionary, thesaurus, encyclopedia, anthology, atlas, almanac, gazetteer, and/or any other type of reference work or combination of reference works. In the illustrated example, the reference work 120 comprises a dictionary that is effective to output definitions in response to the user 102 selecting corresponding words within a rendered content item, such as the currently-rendered content item 104. As with the other items discussed above, the electronic device 106 may store the reference work 120 locally, or the electronic device 106 may access the reference work 120 at the service 112 or another remote entity (e.g., over the network 110).

As illustrated, the user 102 may select one or more words and may request information associated with these word(s) from the reference work 120. In this example, for instance, the user 102 is shown to have selected the word "advantage" from within the content item 104. In this example, FIG. 1 illustrates an indicator 122 to indicate the selected word. In response to this selection, the electronic device 106 may locate and output an entry for this word from the reference work 120. Here, the device 106 is shown to display a definition 124 for the word "advantage" on the display 108.

In addition, in response to the user 102 selecting this word, the electronic device 106 may identify one or more other passages from within the additional content items 114(1)-(N) that also include the word "advantage", or from other content items that are otherwise associated with the user 102 or the device 106. After identifying these passages, the device 106 may output (e.g., display) one or more of these passages. In some instances, when the device 106 identifies multiple passages from the within the additional content items 114(1)-(N), the device 106 ranks these multiple passages and outputs a subset of the passages based on the ranking. For instance, if the device 106 identifies one hundred such passages, the device 106 may rank and select a single passage or any other number of passages for display.

As illustrated, in this example the device 106 has outputted a passage that includes the word "advantage" and that resides in one of the content items 114(1)-(N) accessible to the electronic device 106, namely "The Adventures of Huckleberry Finn". Therefore, as opposed to traditional reference works that may output a static passage that is common for each user that requests information about a particular word, the techniques described herein allow for a passage to be dynamically selected from items that are associated with the user and that are separate from the reference work 120. Here, for instance, the electronic device 106 outputs a passage from "Huck Finn", which the user 102 has previously obtained and potentially has previously read. By providing a passage from a content item that the particular user of the device 106 has obtained, the user is more likely to understand and appreciate the displayed passage. In turn, the user is more likely to understand and appreciate the meaning and/or context of the initially-selected word (here, "advantage).

As discussed above, the additional content items 114(1)-(N) from which the passages are displayed may comprise an assortment of different sources. The items 114(1)-(N) may include, for instance, books, periodicals, website content, movie quotes or content, posts from social networking sites, blogging sites, microblogging sites, and the like.

In addition, the device may dynamically select passages from some content items that are not stored on the device 106 or at the service 110, but that are otherwise associated with the user 102 or the device. For instance, if the user 102 often browses to a particular website using the device 106 (and/or has marked this website as a "favorite"), then the device 106 may identify and pull passages from this website. Or, if the user follows particular users on a social networking, blogging, or micro-blogging service, the device 106 may identify and pull passages from posts of these users. In yet another example, if the user 102 has expressed an interest in a particular movie (e.g., by rating the movie, etc.), then the device 106 may identify and pull movie quotes from this movie. While a few examples have been listed, it is to be appreciated that the device 106 may identify and dynamically select passages from any type of source that is somehow associated with the user 102 or the device 106.

Furthermore, while examples described herein illustrate the device 106 as selecting these passages, in other embodiments the service 112 or another entity may perform some or all of this functionality on behalf of the device 106.

In addition, and also as discussed above, in some instances the device 106 may identify multiple passages from the items 114(1)-(N) (and/or from other items) and may rank the items prior to displaying them on the display 108. This ranking may be based on a similarity between categories or genres of the rendered content item 104 and each of the additional content items 114(1)-(N), how much time has elapsed since the user 102 last accessed each of the additional content items 114(1)-(N), how often users have annotated the passages, a rating associated with each of the additional content items 114(1)-(N), and the like. Furthermore, the ranking may be based on information associated with the user (e.g., demographic information), preferences of the user, a reading level of the user 102, and/or feedback received from the user 102 and/or from other users.

Example Electronic Reader

Figure 2:
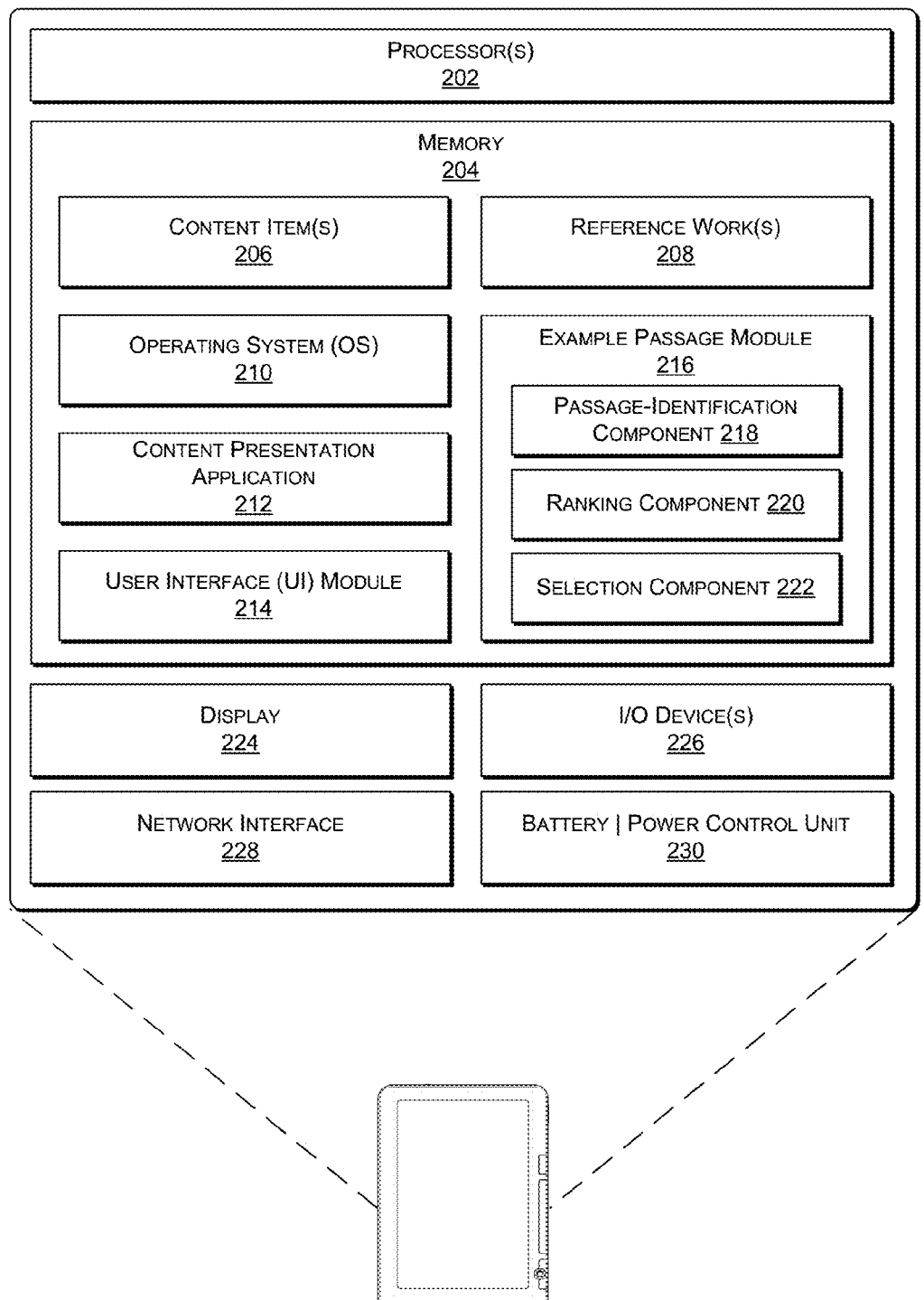
FIG. 2 illustrates relevant components of the example electronic device of FIG. 1.

FIG. 2 is a high-level block diagram showing an example of the electronic device 106, indicating components that are relevant to this discussion. In this embodiment, the electronic device 106 is a dedicated electronic book reader device, designed specifically for the purpose of emulating a traditional book-like reading experience. To that end, it is has a size and weight that is comparable to a paper-based book, and uses a monochrome display having a contrast ratio that approaches that of the printed page. Of course, as discussed above, the electronic device 106 may comprise any other type of device in other instances.

In a very basic configuration, the electronic device 106 includes one or more processors 202 and memory 204. Depending on the configuration of the electronic device 106, the memory 204 may be a type of computer storage media and may include volatile and nonvolatile memory. Thus, the memory 204 may include, but is not limited to, RAM, ROM, EEPROM, flash memory, or other memory technology, or any other medium which can be used to store media items or applications and data which can be accessed by the electronic device 106.

The memory 204 may be used to store any number of functional components that are executable on the processors 202. In many embodiments, these functional components comprise instructions or programs that are executable by the processors 202 and that implement operational logic for performing the actions attributed above to the electronic device 106. In addition, the memory 204 may store various types of data that are referenced by executable programs. Furthermore, it is noted that while the components described below are illustrated as residing on the device 106, in some embodiments some or all of these components may reside remote from the device 106. For instance, some or all of these components may reside on the content item service 112 and/or another server that may perform some or all of the operations described herein.

As discussed above, the memory 204 may store one or more content items (e.g., the content item 104 and the additional content items 114(1)-(N), illustrated in FIG. 1), as well as one or more reference works 208 (e.g., the reference work 120 illustrated in FIG. 1). The memory 204 may also store an operating system 210, a content presentation application 212, and a user interface (UI) module 214. The content presentation application 212 may function to output content on the device. For instance, the application 212 may display visual content on a display, audible content on a speaker, and the like.

The UI module 214, meanwhile, facilitates user operation of the electronic device 106. For instance, the UI module 214 may provide menus and other navigational tools to facilitate selection and rendering of content items. The UI module 214 may further include a browser or other application that facilitates access to sites over a network, such as websites or online merchants, or other sources of electronic content items or other products.

The memory 204 may further store an example passage module 216. The example passage module 216 functions to select one or more example passages to output on the device 106 in response to the UI module 214 receiving an indication that that a user of the device 106 has selected a particular portion of a rendered content item. As illustrated, the example passage module 216 includes a passage-identification component 218, a ranking component 220, and a selection component 222.

In response to a user of the device selecting a particular portion of content from a content item (e.g., the word "advantage"), the passage-identification component 218 identifies other passages from other content items associated with the device or with a user of the device that include this portion.

For instance, the component 218 may identify passages that are located within content items that a user of the device has previously acquired and, hence, content items that are stored on or accessible by the device 106.

For example, the component 218 may identify other passages that include the word "advantage" from content items that a user of the device 106 has previously obtained. In some instances, these content items are stored in the memory 204. In other instances, these content items are stored in a remote account associated with the device. In other instances, meanwhile, these items comprise items that the device or the user account previously stored, but do not currently store (e.g., old versions of a periodical that have been removed from storage due to age).

After identifying one or more passages that include the selected word or other portion of the content item, the ranking component 220 ranks the passages according to one or more criteria. For instance, the component 220 may rank the passages based on how closely the words within the passages match the initially-selected words. For instance, passages that include the word "advantage" may be ranked more highly than words that include the word "advantaged" or "advantages".

In another example, the ranking component 220 may compare a category or genre of the rendered content item with a category or genre of each of the content items that include the identified passages. Here, passages from content items that match (or more closely match) the category/genre of the rendered content item may be ranked more highly than other passages.

In another example, the ranking component 220 determines how often a passage has been annotated. Additionally or alternatively, the ranking component 220 determines how many different unique users have annotated a particular passage. Here, passages that have been annotated often and/or have been annotated by many different users may be ranked more highly than other passages. In a related manner, the ranking component 220 may identify which passages a user of the device 106 has annotated, and may rank these passages higher than the remaining passages.

Also as discussed above, the ranking component 220 may analyze how recently a particular content item was accessed when ranking the passages. Here, the ranking component 220 may rank passages from recently-accessed content items more greatly than other passages.

The ranking component 220 may additionally or alternatively rank passages based on any other criteria. For instance, the component 220 may identify passages or content types that are preferred by the user and, hence, may rank certain passages more highly based on this information.

In another example, the ranking component 220 may rank passages based at least in part on a current location of the device 106. For instance, if a user of the device 106 selects a word while reading a book in a particular geographic location (e.g., San Francisco, Calif.), the component 220 may rank passages from content items associated with that location more highly. These passages may include passages written by a local author, passages from within a book about the area, or the like.

While a few examples have been given, it is to be appreciated that the ranking component 220 may rank these passages based on any other criteria or combination of criteria.

Once the passages have been ranked, the selection component 22 may select one or more passages to output on the electronic device 106. For instance, the selection component 222 may select the "Top X" ranked passages for output, where "X" is any number (user-defined or otherwise). In another instance, the selection component 222 may output each passage that has a weighted value that is greater than a threshold. As such, the number of outputted passages may vary on a per-selection basis. Without regard to the number of passages selected for output, the component 222 may output these passages visually, audibly, or in any other manner.

As illustrated, the electronic device 106 may further include a display 224 upon which the content items and the selected passages may be rendered. In one implementation, the display 224 uses electronic paper display technology. In general, an electronic paper display is one that has a high resolution (150 dpi or better) and is bi-stable, meaning that it is capable of holding text or other rendered images even when very little or no power is supplied to the display. The electronic paper display technology may also exhibit high contrast substantially equal to that of print on paper. Some example electronic paper displays that may be used with the implementations described herein include bi-stable LCDs, MEMS, cholesteric, pigmented electrophoretic, and others. One exemplary electronic paper display that may be used is an E Ink-brand display. Touch sensitive technology may be overlaid or integrated with the electronic paper display technology to enable user input via contact or proximity to the screen.

The electronic device 106 may further be equipped with various input/output (I/O) devices 226. Such devices may include various user interface controls (e.g., buttons, joystick, keyboard, etc.), audio speaker, connection ports, and so forth. In some instances, a user of the electronic device 106 utilizes one or more of the input devices to select portions of content items rendered on the display 224. The UI module 214 may receive indications of these selections and may in turn pass these indications to the example passage module 216, which operates as discussed immediately above.

Furthermore, the device 106 may include a network interface 228, which may support both wired and wireless connection to various networks, such as cellular networks, radio, WiFi networks, short range networks (e.g., Bluetooth), IR, and so forth. The network interface 228 facilitates receiving electronic books and other content as described herein.

The electronic device 106 may also include a battery and power control unit 230. The power control unit operatively controls an amount of power, or electrical energy, consumed by the electronic device 106. Actively controlling the amount of power consumed by the electronic device may achieve more efficient use of electrical energy stored by the battery.

The electronic device 106 may have additional features or functionality. For example, the electronic device 106 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data.

Example User Interfaces (UIs)

Figure 3A:
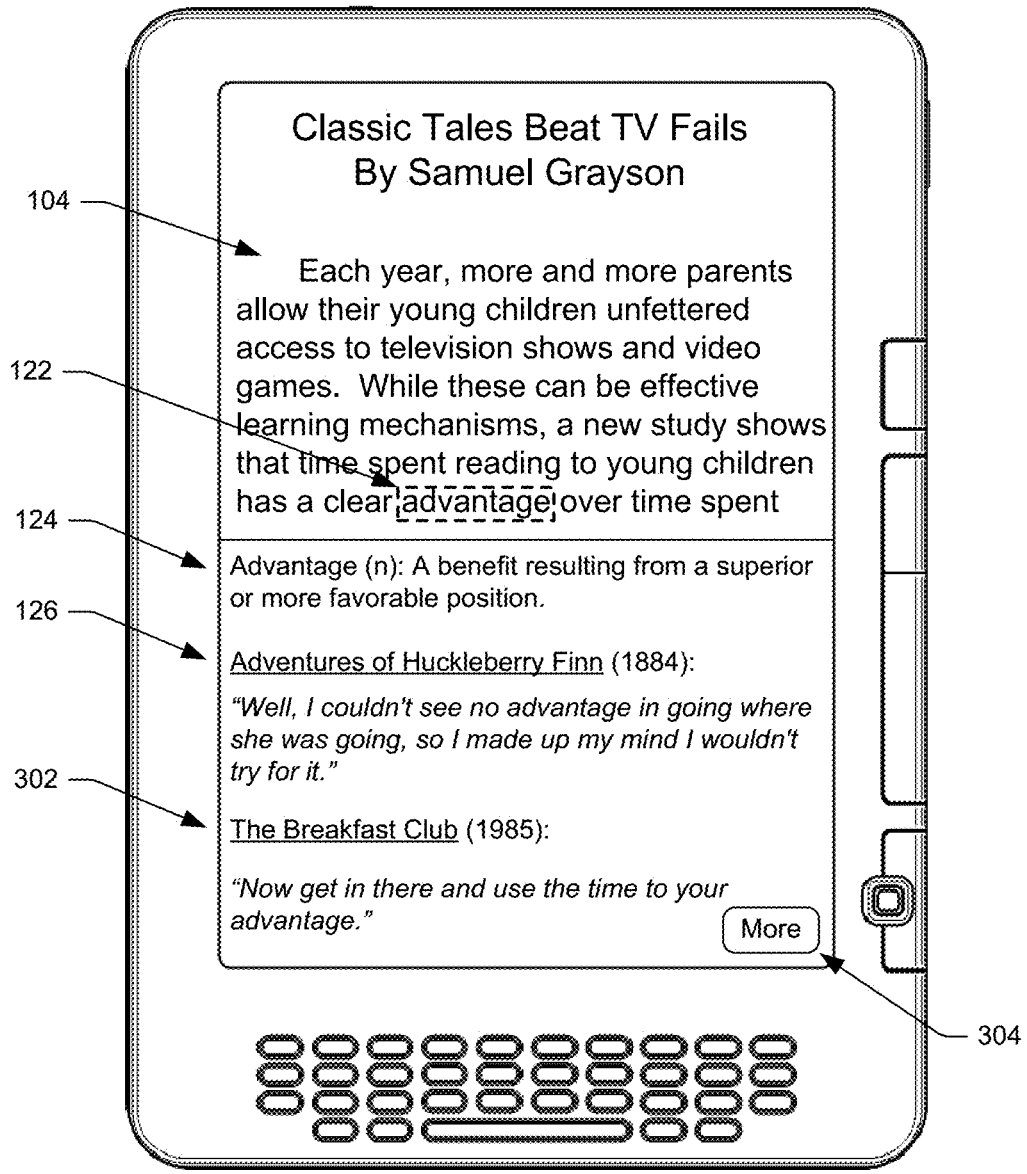
FIG. 3A illustrates an example user interface (UI) on the electronic device of FIG. 1. This UI includes a content item that a user is currently consuming, a definition of a word therein, and two example passages that include this word. These passages are found within content items that are associated with a user of the device or with the device itself.

FIG. 3A illustrates an example user interface (UI) rendered on the electronic device 106 from FIG. 1. This UI includes the content item 104 that the user 102 is currently consuming, and well as the indication 122 that the user 102 has selected a word from this content item 104. The user 102 may make this selection via a touch screen, a five-way controller, a joystick, or via any other type of input device.

By selecting this portion of the content item (here, the word "advantage"), the user 102 may be requesting to view information associated with the word. For instance, the user 102 may request to view an entry of the word in a reference work, such as a dictionary, a thesaurus, or the like. In some instances, the selection alone is effective to request this information, while in other instances the user 102 may also select an option from a menu or may otherwise interact with the device 106 to make this request. In this example, the device 106 displays the definition 124 of the word in response to the selection.

In addition, in this example the device 106 also displays two example passages that include this word. Each of these passages are found within content items that are associated with the user 102 of the device or with the device 106 itself, such as the additional content items 114(1)-(N) that the user 102 has previously acquired. Here, the device displays the passage 126 from "The Adventures of Huckleberry Finn", which the user may have previously downloaded or otherwise consumed on the electronic device 106 or on another device associated with the user. In addition, the device 106 displays a passage 302 from a movie entitled "The Breakfast Club". As illustrated, this passage 302 also includes the word "advantage".

The example movie "The Breakfast Club" may be associated with the user 102 in any number of ways. For instance, the user 102 may have viewed this movie on the electronic device 106 or on another device, may have provided a rating or review of the movie on a website, may have posted information about the movie on a social network, blogging, or microblogging site, or may have otherwise indicated an interest in the movie in any other way. Regardless of how these content items are associated with the user 102 or the device 102, dynamically selecting and displaying the passages 126 and 302 rather than generic dictionary passages that include the word "advantage" provide an experience that is tailored to the particular user 102 of the device 106. By doing so, the user 102 is more likely to appreciate and understand the passages 126 and 302 and, hence, the selected word.

As illustrated, the UI also includes an example icon 304 entitled "More". When the user 102 selects this icon, the user is able to view additional passages that include the selected word (or other portion of the content item 104). As with the illustrated passages 126 and 302, these additional passages may be found within content items associated with the user 102, such as the additional content items 114(1)-(N) that the user 102 has previously acquired.

Figure 3B:
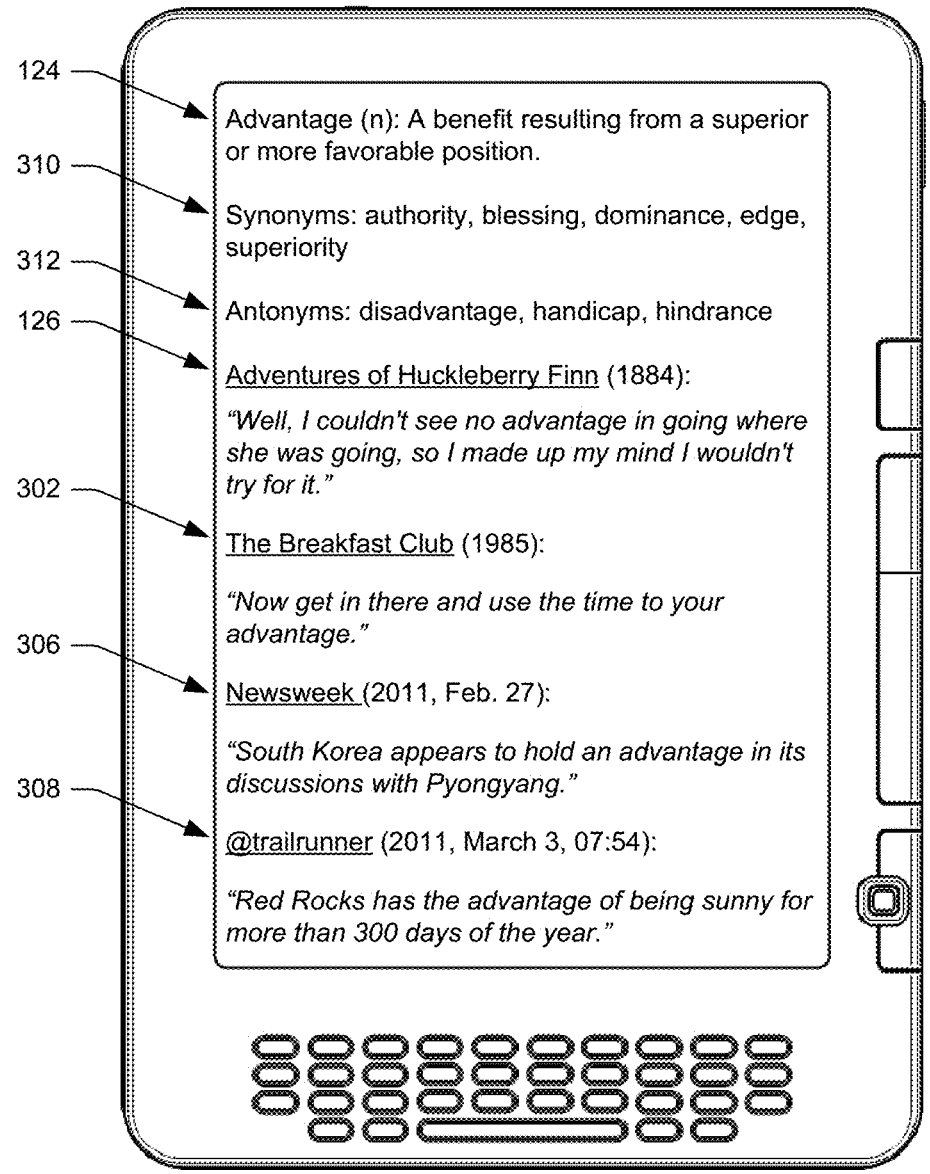
FIG. 3B illustrates the UI from FIG. 3A after the user of the device selects the example "more" icon. Here, the UI includes multiple other example passages that include the word selected in FIG. 3A.

FIG. 3B illustrates the UI from FIG. 3A after the user 102 of the device 106 selects the example icon 304. As illustrated, this UI includes the previously-described definition 124 of the selected word, as well as the previously-described passages 126 and 302. Here, however, the UI also includes additional example passages 306 and 308 that also include the selected word "advantage". As illustrated, the passage 306 is from a particular issue of a periodical ("Newsweek"), which the user 102 may have previously acquired by purchasing the issue or subscribing to the periodical generally.

In addition, the passage 308 comprises a post from a particular user ("trailrunner") on a microblogging site. In some examples, the user 102 of the device 106 may "follow" the example user "trailrunner" on the microblogging site. As such, when the user 102 selects a word, such as "advantage", the electronic device 106 may search posts submitted by this user (and other users that the user 102 follows on the site) to identify posts that include the selected word.

FIG. 3B further illustrates that the electronic device 106 may also display additional reference-work information in response to the user selecting the "more" icon 304. Here, for instance, the device 106 displays a set of synonyms 310 and a set of antonyms 312 for the word "advantage". In some instances, the synonyms and/or antonyms may be displayed in a manner (e.g., in an order) that is also tailored to the user 102. For instance, the device 106 may order these synonyms/antonyms based on a reading level of a user, based on how often the synonyms/antonyms appeared in other content items previously acquired or consumed by the user, or based on any other factor combination of factors that are unique to the user 102 and/or the device 106.

Figure 4A:
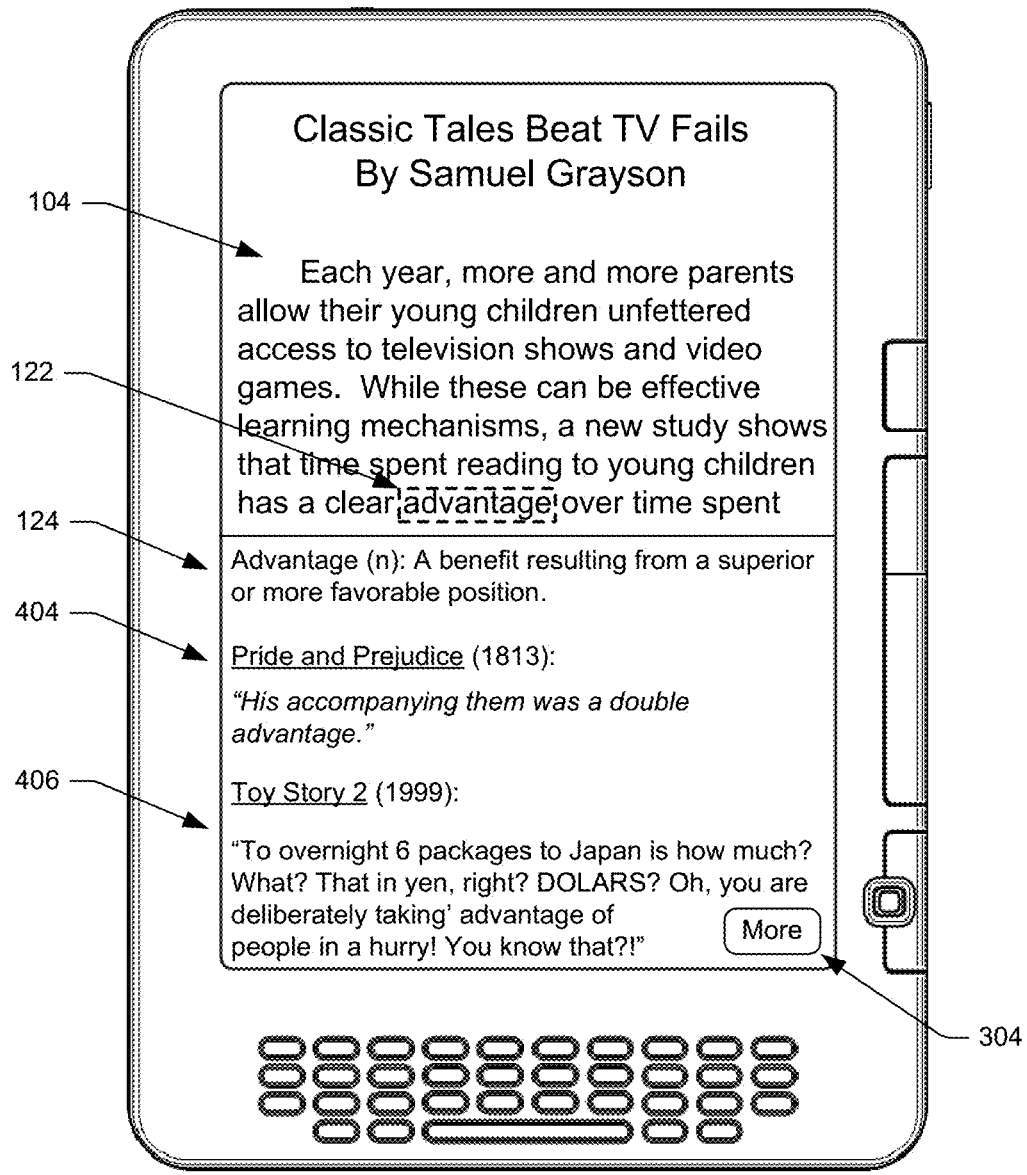
FIG. 4A illustrates an example UI of a different electronic device rendering the same content item as shown in FIG. 3A. Here, however, the UI also includes the definition of the word and different passages that include the word, with these passages being from content items associated with the different device or a user of the different device.

FIG. 4A illustrates an example UI of a different electronic device 402. This electronic device 402 is associated with a different user, but currently renders the same content item 104 as the device 106 illustrated in FIGS. 1 and 3A. In addition, this UI indicates that the user of the electronic device 402 has selected the same word ("advantage") and, therefore, the device 402 renders the definition 124 associated with this word. Here, however, because this device 402 is associated with a different user, this device is associated with a different set of content items. That is, the user of the device 402 has likely acquired (e.g., purchased) different content items than the user 102 of the device 106 described above. As such, the device 402 and/or the content item service 112 store a different set of content items in association with the device 402. As such, when a user of the device 402 selects the same word as the user 102 of the device 106, the device 402 will likely surface different example passages associated with this word.

In this example, the device 402 displays an example passage 404 from the book "Pride and Prejudice", as well as an example passage 406 from the movie "Toy Story 2". As with the passages described above, both of the passages 404 and 406 include the selected word "advantage". However, these example passages 406 and 408 are from content items that are associated with the user of the device 402 For instance, the user of the device 402 may have previously acquired Pride and Prejudice" and "Toy Story 2", or the user of the device 104 may be associated with these items in another way.

Figure 4B:
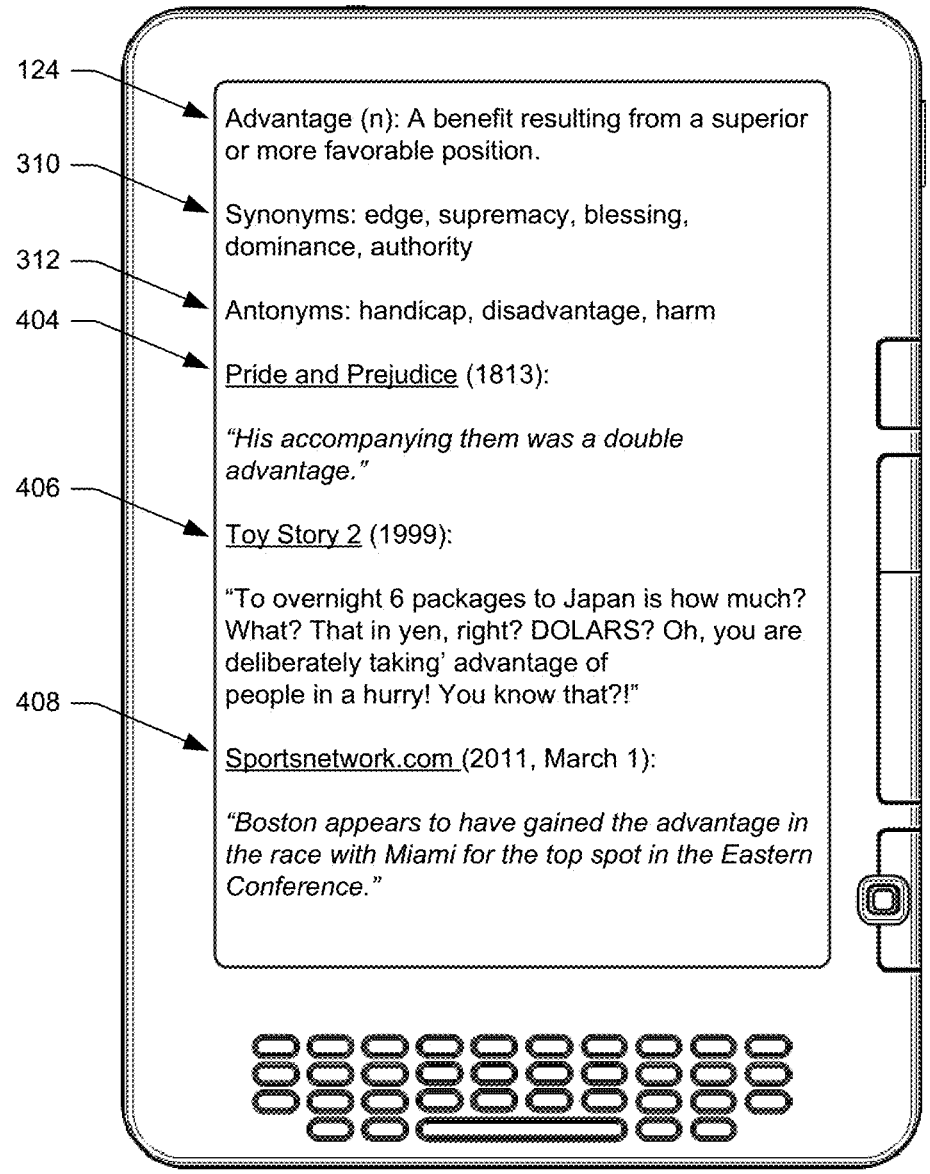
FIG. 4B illustrates the UI from FIG. 4A after the user of the device selects the example "more" icon.

FIG. 4B illustrates the UI from FIG. 4A after the user of the device 402 selects the example "more" icon 304. Here, the device 402 displays the definition, the example synonyms 310 and antonyms 312, the previously-described passages 404 and 406, as well as an additional passage 408 that includes the word "advantage". This passage is from a website "Sportsnetwork.com", which may be associated with the user of the device 102 based on the user showing an interest in this particular website. For instance, the user may have previously identified this site as a "favorite" of the user on a browser operating on the electronic device 402.

While a few example passages have been listed, it is to be appreciated that the devices 106 and 402 can display any other number of example passages from any other number of content items associated with the respective users. Furthermore, the UIs from FIGS. 3B and 4B may also include an icon that is selectable by the users to view additional example passages that have been dynamically selected for the respective users.

Furthermore, FIG. 4B illustrates that the number and order of the displayed synonyms and antonyms have also been tailored to user of the device 402. As discussed above with reference to FIG. 3B, this modification may be based on one or a variety of factors.

Example Processes

Figure 6:
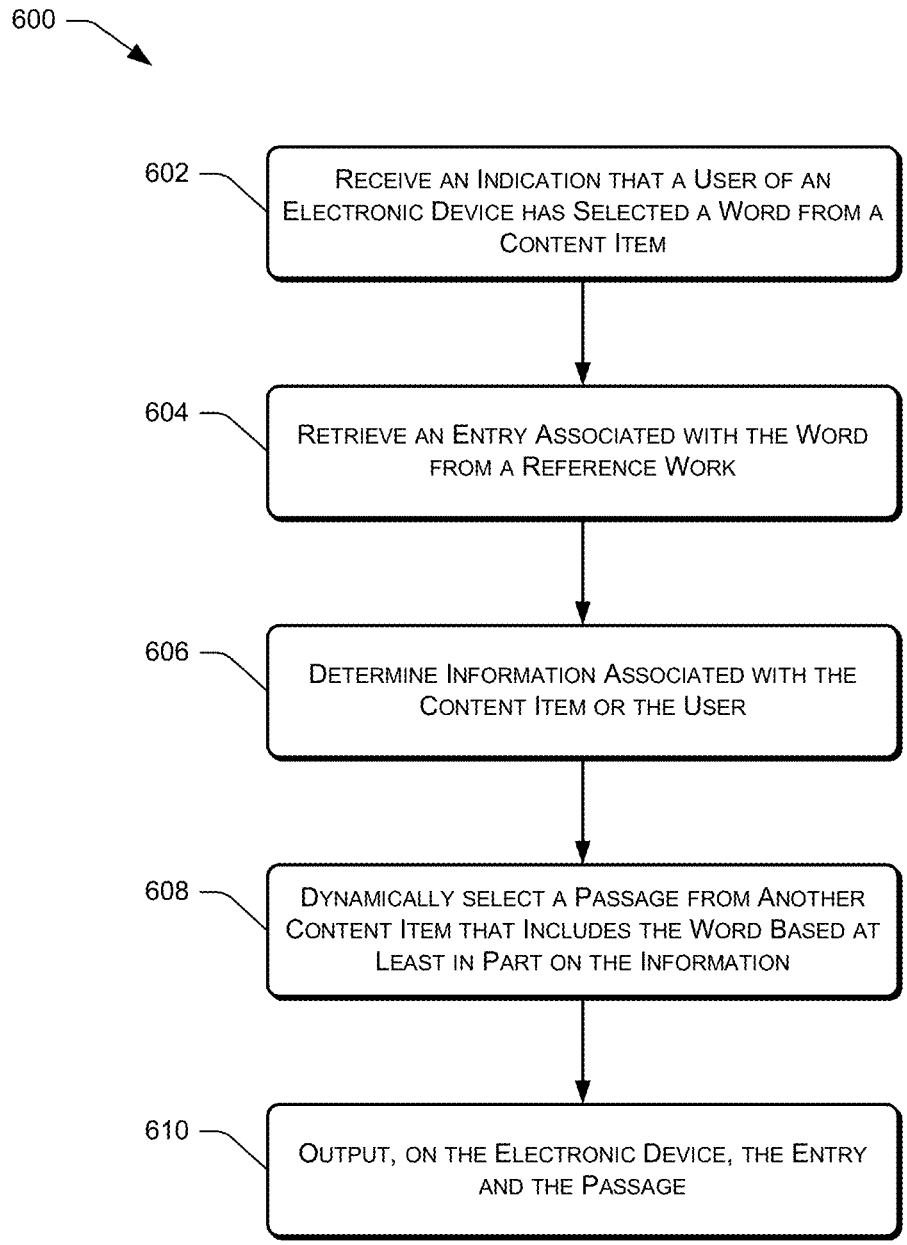
FIG. 6 is a flow diagram of an illustrative process for receiving a selection of at least one word from a content item, retrieving a reference work entry associated with the word, dynamically selecting one or more passages that include the word, and outputting the reference work entry and the selected passage(s).

FIGS. 5 and 6 are flow diagrams of respective example processes 500 and 600 for implementing the techniques described herein. Each of these processes is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

The process 500 includes, at operation 502, receiving a selection of at least one word within an electronic book. For instance, a user of the electronic device 106 may select a particular word or a particular set of words via a touch screen, a five-way controller, or any other input device. In response, an operation 504 retrieves a definition of the word from a reference work, such as a dictionary. As discussed above, in other embodiments, this operation may retrieve information from another type of reference work, such as an entry of the word(s) in an encyclopedia, an almanac, a thesaurus, or the like.

Next, an operation 506 identifies one or more passages (e.g., phrases, sentences, paragraphs, etc.) that include the selected word. These passages may be identified from content items that are associated with the user or the device, such as from content items that the user has previously acquired. After identifying these passages, an operation 508 ranks the identified passages. As discussed above, this ranking may be based on an array of different criteria. Finally, an operation 510 displays or otherwise outputs the definition of the word and the passages on the device, with the passages being displayed based at least in part on the ranking.

FIG. 6 illustrates the process 600, which includes an operation 602 that receives an indication that a user of an electronic device has selected at least one word from a rendered content item. In response, an operation 604 retrieves a reference work entry associated with the selected word. Next, an operation 606 determines information associated with the content item or user. This may include determining content items that the user has previously acquired, preferences of the user, demographic information of the user, a reading level of the user, or the like.

Thereafter, an operation 608 dynamically selects one or more passages that include the selected word, with the passages being selected based at least in part on the determined information. For instance, the passages may be selected from content items that the user of the device has previously (e.g., from content items stored on the device or stored in a remote account associated with the device). Finally, an operation 610 outputs the reference work entry and the selected passage(s) on the device.

Conclusion

Note that the various techniques described above are assumed in the given examples to be implemented in the general context of computer-executable instructions or software, such as program modules, executed by one or more computers or other devices. Generally, program modules include routines, programs, objects, components, data structures, etc. for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

The invention claimed is:

1. A method comprising:
    under control of one or more computer systems configured with specific executable instructions,
    receiving a selection of a word found within an electronic book being displayed by an electronic book reader, the electronic book reader having access to the electronic book, a dictionary, and multiple other electronic books; and
    at least partly in response to the receiving of the selection:
        retrieving a definition of the word from the dictionary;
        identifying a first passage and a second passage that include the word from within one of the multiple other electronic books;
        ranking the first passage and the second passage based at least in part on a first weight assigned to the first passage and a second weight assigned to the second passage;
        selecting the first passage based at least in part on the ranking, and further based at least in part on a determination that the first weight assigned to the first passage exceeds a threshold; and
        displaying the definition of the word and the first passage on the electronic book reader.

2. A method as recited in claim 1, wherein the identifying of the first passage and the second passage comprises searching the multiple other electronic books for passages that include the word, while refraining from searching other electronic books that are not accessible to the electronic book reader.

3. A method as recited in claim 1, wherein the electronic book reader has access to electronic books that are stored on the electronic book reader or that are stored on an account that is associated with and remote from the electronic book reader.

4. A method as recited in claim 1, wherein the receiving of the selection comprises receiving a request for the definition of the word.

5. A method as recited in claim 1, wherein the displaying comprises displaying the definition of the word and the first passage at a same time or at respectively different times.

6. A method as recited in claim 1, wherein the receiving of the selection comprises receiving a selection of multiple words in a particular order, and wherein the identifying of the first passage and the second passage comprises identifying a passage within one of the multiple electronic books that includes each of the multiple words in the particular order.

7. A method as recited in claim 1, further comprising determining the first weight and the second weight by:
   determining a genre or category of the electronic book being displayed by the electronic book reader; and
   comparing the determined genre or category with a genre or category of each electronic book associated with at least one of the first passage and the second passage.

8. A method as recited in claim 1, further comprising determining the first weight and the second weight by determining, for each electronic book associated with at least one of the first passage and the second passage, a last time that the electronic book was accessed by the user of the electronic book reader.

9. A method as recited in claim 1, further comprising determining the first weight and the second weight by determining, for each electronic book associated with at least one of the first passage and the second passage, a frequency in which the electronic book appears in a list created by a user of a community of users.

10. A method as recited in claim 1, further comprising determining the first weight and the second weight by determining, for each of the first passage and the second passage, a frequency in which the first passage and the second passage have been annotated.

11. A method as recited in claim 1, further comprising determining the first weight and the second weight by determining, for each electronic book associated with at least one of the first passage and the second passage, a rating associated with the electronic book.

12. A method as recited in claim 11, wherein the determining of the rating for each electronic book comprises determining a rating made by the user associated with the electronic book reader.

13. A method as recited in claim 11, wherein the determining of the rating for each electronic book comprises determining a rating from a community of users.

14. A method as recited in claim 1, further comprising determining the first weight and the second weight based at least in part on associations between a geographic location associated with the electronic book reader and an electronic book associated with at least one of the first passage or the second passage.

15. A method as recited in claim 1, wherein identifying the first passage and the second passage comprises identifying multiple passages within respective ones of the multiple other electronic books.

16. One or more non-transitory computer-readable media storing computing executable instructions that, when executed by one or more processors, cause the one or more processors to perform acts comprising:
   receiving an indication that a user of an electronic device has selected at least one word found within a content item; and
   at least partly in response to the receiving of the indication:
      retrieving an entry associated with the selected word from a reference work accessible to the electronic device;
      selecting a passage from another content item of multiple different content items that includes the selected word or a stem of the selected word, the selecting comprising;
         identifying a first passage and a second passage that include the selected word or a stem of the selected word from within the multiple different content items;
         ranking the first passage and the second passage, the ranking being based at least in part on a first weight assigned to the first passage and a second weight assigned to the second passage; and
         selecting the first passage based at least in part on a determination that the first weight assigned to the first passage meets or exceeds a threshold; and
      outputting, on the electronic device, the entry from the reference work and the first passage from the other content item.

17. One or more non-transitory computer-readable media as recited in claim 16, wherein the content item comprises an electronic book, an audio file, or a video file.

18. One or more non-transitory computer-readable media as recited in claim 16, wherein the other content item comprises a book, a website, a social network site, a blogging site, or a micro-blogging site.

19. One or more non transitory computer-readable media as recited in claim 16, wherein the reference work comprises a dictionary, a thesaurus, an encyclopedia, an almanac, an atlas, or a gazetteer.

20. One or more non-transitory computer-readable media as recited in claim 16, wherein the first passage comprises text or an image, and the outputting comprises visually displaying the text or the image on a display of the electronic device.

21. One or more non-transitory computer-readable media as recited in claim 16, wherein the first passage comprises an audio file, and the outputting comprises audibly outputting the audio file on a speaker of the electronic device.

22. One or more non-transitory computer-readable media as recited in claim 16, wherein the acts further comprise determining information associated with the content item or the user, and wherein the selecting the first passage comprises selecting the first passage based at least in part on the information associated with the content item or the user.

23. One or more non-transitory computer-readable media as recited in claim 22, wherein the information associated with the content item or the user comprises a genre or category of the content item or a genre or category of content items previously accessed by the user.

24. One or more non-transitory computer-readable media as recited in claim 16, wherein the first passage is from another content item that is stored on the electronic device.

25. One or more non-transitory computer-readable media as recited in claim 16, wherein the first passage is from another content item that is accessible to the electronic device.

26. One or more non-transitory computer-readable media as recited in claim 16, wherein the selecting the first passage comprises:
   determining that the first passage matches the selected word in addition to matching the stem of the selected word.

27. One or more non-transitory computer-readable media as recited in claim 16, wherein the selecting the first passage comprises:
   comparing a genre of the content item being output by the electronic device to a genre of each of the multiple different content items; and
   wherein the selecting the first passage is further based at least in part on the comparing.

28. One or more non-transitory computer-readable media as recited in claim 16, wherein the selecting the first passage comprises:
   determining, for each of the multiple different content items, a last time that the user of the electronic device accessed the content item; and
   wherein the selecting the first passage is further based at least in part on the determining.

29. One or more non-transitory computer-readable media as recited in claim 16, wherein the selecting the first passage comprises:
  determining, for each of the multiple different content items, a rating associated with the content item; and
  wherein the selecting the first passage is further based at least in part on the determining.

30. One or more non-transitory computer-readable media as recited in claim 16, wherein the selecting the first passage comprises:
  determining a number of times that a group of users have annotated at least one of the first passage or the second passage, or a number of users that have annotated at least one of the first passage or the second passage; and
  wherein the selecting the first passage is further based at least in part on the determining.

31. One or more non-transitory computer-readable media as recited in claim 16, wherein the selecting the first passage comprises determining that the user of the electronic device has previously annotated the first passage.

32. One or more non-transitory computer-readable media as recited in claim 16, wherein the selecting the first passage is further based on demographic information associated with the user.

33. One or more non-transitory computer-readable media as recited in claim 16, wherein the selecting the first passage is further based on a reading level associated with the user.

34. An electronic device comprising:
  one or more processors;
  memory;
  an electronic book, stored in the memory;
  a display, coupled to the one or more processors and configured to display the electronic book;
  an input device, coupled to the one or more processors and configured to facilitate operation of the electronic device by a user; and
  executable instructions stored in the memory and that, when executed by the one or more processors, cause the one or more processors to perform acts comprising:
    receiving an indication that the user has selected a portion of text of the electronic book with use of the input device;
    retrieving an entry associated with the portion of text in a reference work;
    selecting an example passage that includes the portion of text from another electronic book of multiple other electronic books that the user of the electronic device has previously obtained, the example passage being selected by;
    identifying a first passage and a second passage that include the portion of text from within the multiple other electronic books that the user of the electronic device has previously obtained;
    ranking the first passage and the second passage based at least in part on a first weight assigned to the first passage and a second weight assigned to the second passage;
    selecting the first passage based at least in part on a determination that the first weight assigned to the first passage meets or exceeds a threshold; and
    displaying the entry and the example passage on the display.

35. An electronic device as recited in claim 34, wherein the another electronic book of multiple other electronic books that the user of the electronic device has previously obtained is stored on the electronic device or stored in an account associated with and accessible by the electronic device.

36. An electronic device as recited in claim 34, wherein the another electronic book of multiple other electronic books that the user of the electronic device has previously obtained comprises an electronic book that is no longer stored by the electronic device and is no longer stored by an account associated with and accessible by the electronic device.

37. An electronic device as recited in claim 34, wherein the portion of text comprises a word, and the entry associated with the portion of text is associated with a stem of the word in the reference work.

38. An electronic device as recited in claim 34, wherein the acts further comprise selecting and displaying multiple example passages associated with the portion of text, each of the multiple example passages being selected from other electronic books that the user of the electronic device has previously obtained.

39. An electronic device as recited in claim 38, wherein the acts further comprise determining a ranking of the multiple example passages and displaying the multiple example passages on the display in an order that is based at least in part on the ranking.

* * * * *